US012663157B2

(12) United States Patent
Lambert et al.

(10) Patent No.: US 12,663,157 B2
(45) Date of Patent: Jun. 23, 2026

(54) COOK TOP ASSEMBLY HAVING A MONITORING SYSTEM AND METHOD OF MONITORING A COOKING PROCESS

(71) Applicant: Pitco Frialator, Inc., Bow, NH (US)

(72) Inventors: Nathaniel A. Lambert, Hooksett, NH (US); Steven J. Cyr, Londonderry, NH (US); Michael T. Fecteau, Derry, NH (US)

(73) Assignee: Pitco Frialator, LLC, Elgin, IL (US)

(*) Notice: Subject to any disclaimer, the term of this patent is extended or adjusted under 35 U.S.C. 154(b) by 504 days.

(21) Appl. No.: 16/482,933

(22) PCT Filed: Feb. 6, 2018

(86) PCT No.: PCT/US2018/017066
§ 371 (c)(1),
(2) Date: Aug. 1, 2019

(87) PCT Pub. No.: WO2018/145088
PCT Pub. Date: Aug. 9, 2018

(65) Prior Publication Data

US 2020/0011535 A1 Jan. 9, 2020

Related U.S. Application Data

(60) Provisional application No. 62/455,330, filed on Feb. 6, 2017.

(51) Int. Cl.
*F24C 7/08* (2006.01)
*F24C 15/20* (2006.01)
(Continued)

(52) U.S. Cl.
CPC .......... *F24C 7/083* (2013.01); *F24C 15/2042* (2013.01); *H05B 1/0266* (2013.01); *H05B 6/062* (2013.01); *H05B 2213/06* (2013.01)

(58) Field of Classification Search
CPC ...... F24C 15/2042; F24C 7/082; F24C 7/083; F24C 7/087; F24C 7/088; H05B 1/0258;
(Continued)

(56) References Cited

U.S. PATENT DOCUMENTS 4,120,452 A 10/1978 Kimura et al.
4,812,963 A 3/1989 Albrecht et al.
(Continued)

FOREIGN PATENT DOCUMENTS

CN 101946559 A 1/2011
CN 102734846 A 10/2012
(Continued)

OTHER PUBLICATIONS

U.S. Appl. No. 09/587,797, filed Sep. 4, 2001, Keother.
(Continued)

*Primary Examiner* — Sang Y Paik
(74) *Attorney, Agent, or Firm* — Crowell & Moring LLP

(57) ABSTRACT

A cook top assembly includes a cooking surface. A monitoring system is configured to monitor and control a cooking process on the cooking surface. The monitoring system includes at least one temperature sensor configured to sense a first temperature change at the cooking surface. A controller operatively coupled to the temperature sensor is configured to receive from the temperature sensor a signal indicating the first temperature change and activate a timing module operatively coupled to the controller for a first predetermined time period based at least in part on the first temperature change sensed by the temperature sensor.

2 Claims, 3 Drawing Sheets

(51) Int. Cl.
*H05B 1/02* (2006.01)
*H05B 6/06* (2006.01)

(58) Field of Classification Search
CPC ................ H05B 1/0261; H05B 1/0266; H05B 2213/00; H05B 2213/06; H05B 2213/07; H05B 6/062; H05B 3/68; H05B 3/681; H05B 3/683
USPC ............................................ 219/443.1–468.2
See application file for complete search history.

(56) References Cited

U.S. PATENT DOCUMENTS

| | | | | |
|---|---|---|---|---|
| 5,723,846 | A | 3/1998 | Koether et al. | |
| 5,875,430 | A | 2/1999 | Koether | |
| 5,900,801 | A | 5/1999 | Heagle et al. | |
| 5,981,916 | A * | 11/1999 | Griffiths ................. | H05B 3/746 219/447.1 |
| 6,133,555 | A | 10/2000 | Brenn | |
| 6,759,635 | B2 | 7/2004 | Lile | |
| 6,860,192 | B2 | 3/2005 | Sharpe | |
| 7,699,051 | B2 | 4/2010 | Gaqas et al. | |
| 7,866,312 | B2 | 1/2011 | Erdmann | |
| 7,877,291 | B2 | 1/2011 | Koether et al. | |
| 8,060,408 | B2 | 11/2011 | Koether et al. | |
| 8,276,505 | B2 | 10/2012 | Buehler | |
| 8,530,824 | B2 | 9/2013 | Has et al. | |
| 8,712,851 | B2 | 4/2014 | Koether et al. | |
| 8,820,219 | B2 | 9/2014 | Buehler | |
| 9,109,805 | B2 | 8/2015 | Bach | |
| 9,494,324 | B2 | 11/2016 | Livchak et al. | |
| 2003/0127451 | A1 | 7/2003 | Lile | |
| 2004/0016348 | A1 | 1/2004 | Sharpe | |
| 2005/0274712 | A1* | 12/2005 | Gagas ..................... | F24C 7/087 219/385 |
| 2006/0086258 | A1 | 4/2006 | Sharpe | |
| 2007/0053195 | A1 | 3/2007 | Alberti | |
| 2007/0193753 | A1 | 8/2007 | Adiga et al. | |
| 2008/0053426 | A1 | 3/2008 | Erdmann | |
| 2008/0082217 | A1* | 4/2008 | Sung ....................... | F24C 7/082 700/299 |
| 2009/0272372 | A1 | 11/2009 | Griffin et al. | |
| 2010/0051608 | A1 | 3/2010 | Tominaga et al. | |
| 2010/0065551 | A1 | 3/2010 | Tominaga et al. | |
| 2010/0313768 | A1 | 12/2010 | Koether et al. | |
| 2011/0000903 | A1 | 1/2011 | Noguchi et al. | |
| 2011/0000904 | A1 | 1/2011 | Sakakibara et al. | |
| 2011/0088679 | A1 | 4/2011 | Lerner | |
| 2012/0111852 | A1 | 5/2012 | Bach | |
| 2012/0320345 | A1 | 12/2012 | Kleinert et al. | |
| 2013/0092032 | A1 | 4/2013 | Cafferty et al. | |
| 2013/0101709 | A1 | 4/2013 | Rader | |
| 2013/0184857 | A1 | 7/2013 | Heffernan et al. | |
| 2013/0187781 | A1 | 7/2013 | Bach | |
| 2014/0164153 | A1 | 6/2014 | Koether et al. | |
| 2015/0331395 | A1 | 11/2015 | Hepperla et al. | |
| 2015/0334785 | A1* | 11/2015 | Visher .................. | H05B 6/6438 219/626 |
| 2016/0192790 | A1 | 7/2016 | Heffernan et al. | |

FOREIGN PATENT DOCUMENTS

| | | | |
|---|---|---|---|
| CN | 104880974 | A | 9/2015 |
| CN | 105520651 | A | 4/2016 |
| EP | 1153164 | A1 | 11/2001 |
| EP | 2 124 506 | A1 | 11/2009 |
| EP | 2 247 158 | A1 | 11/2010 |

OTHER PUBLICATIONS

U.S. Appl. No. 09/946,461, filed Sep. 4, 2001, Keother.

International Preliminary Report on Patentability and Written Opinion for PCT/US2018/016866, dated Aug. 6, 2019, 6 pp.

State of Israel, Minisstry of Justice, Office Action Dated Jan. 2, 2009 for 60747, 2 pp.

International Search Report for PCT/US02/28316, dated May 27, 2004, 4 pp.

Gale Group Trade & Industry DB, Professional Builder and Remodler, v56, n1, p. 135(22), Jan. 1992, Energize Your Market with SMART HOUSE, 9 pp.

Examination Report No. 1 dated May 27, 2020 from corresponding Australian Patent Application 2018215686 (4 pages).

First Office Action dated May 7, 2021 for corresponding Chinese Application No. 201880016173.9 (9 pages—foreign text).

Office Action (4 pages) dated Jan. 30, 2024 out of corresponding Canadian Application 3,052,634.

Office Action (7 pages) dated Mar. 13, 2024 out of corresponding Mexican Application MX/A/2019/009280.

Office Action (5 pages) dated Oct. 2, 2024 out of corresponding Canadian Patent Application 3,052,634.

* cited by examiner

COOK TOP ASSEMBLY HAVING A MONITORING SYSTEM AND METHOD OF MONITORING A COOKING PROCESS

BACKGROUND

Many cooking processes performed on conventional cook top appliances are largely dependent upon a skilled cook monitoring the cooking process to ensure that food items are cooked appropriately, preventing the food items from being undercooked or overcooked, for example. Further, in commercial applications, more than one cook may be working on the cook top appliance at the same time. Each cook may have his or her own cooking tendencies or skill level different from the other cooks. As a result, each cook may cook or prepare a food item, e.g., a burger, differently from the other cooks, which promotes inconsistent cooking processes and food preparations between the different cooks. Accordingly, a monitoring system and associated monitoring methods to facilitate consistent cooking processes and food preparation is desired.

SUMMARY

In one embodiment, a cook top assembly includes a cooking surface. A monitoring system is configured to monitor and control a cooking process on the cooking surface. The monitoring system includes a temperature sensor configured to sense a first temperature change at the cooking surface. A controller is operatively coupled to the temperature sensor. The controller is configured to receive from the temperature sensor a first signal indicating the first temperature change and activate a timing module operatively coupled to the controller for a first predetermined time period based at least in part on the first temperature change sensed by the temperature sensor.

In another embodiment, a monitoring system for a cook top assembly including a cooking surface having a plurality of cooking areas includes a temperature sensor configured to sense a first temperature change at the cooking surface within a first cooking area of the plurality of cooking areas. A controller is operatively coupled to the temperature sensor and includes a timing module. The controller is configured to receive from the temperature sensor a first signal indicating the first temperature change and activate the timing module for a first predetermined time period based at least in part on the first temperature change sensed by the temperature sensor.

In yet another embodiment, a method for monitoring and controlling a cooking process on a cooking surface of a cook top assembly is described. The cooking surface has a plurality of cooking areas. The method includes sensing, with a temperature sensor, a first temperature change at the cooking surface within a first cooking area of the plurality of cooking areas, and activating, by a controller, a timing module for a first predetermined time period based at least in part on the first temperature change sensed by the temperature sensor.

DETAILED DESCRIPTION

Figure 1:
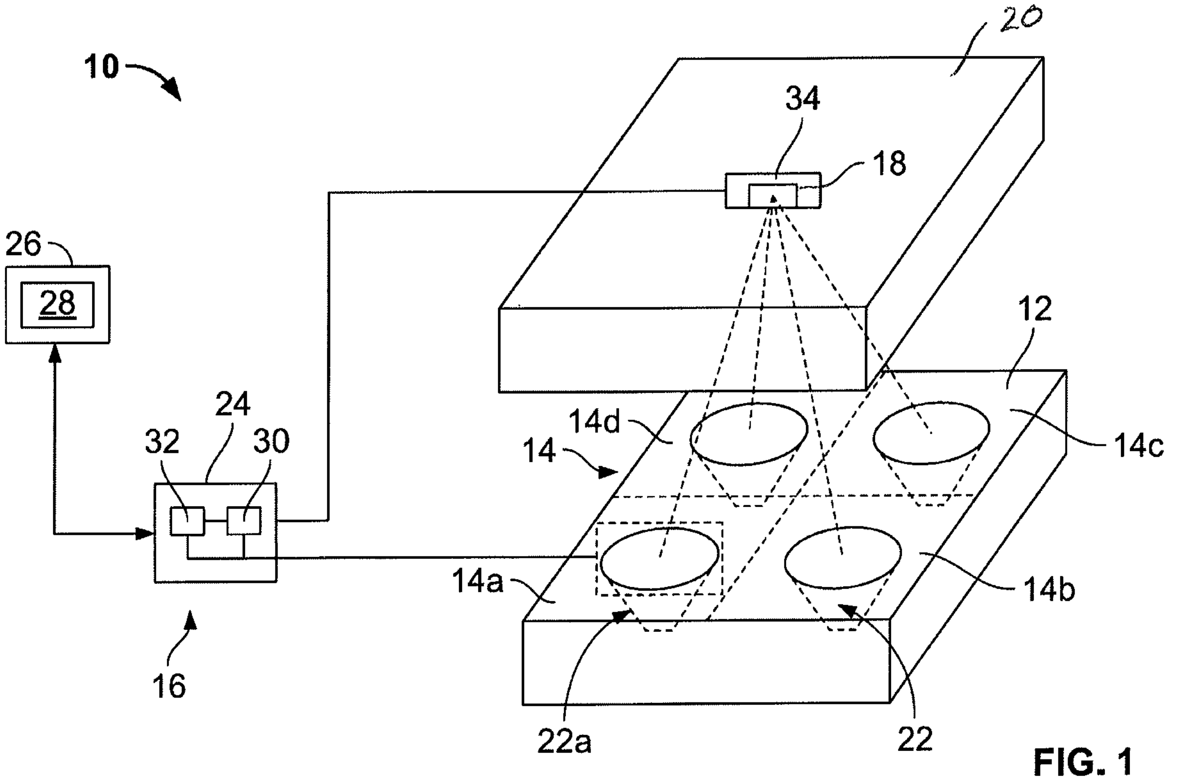
FIG. 1 is a perspective view of an example cook top assembly including a monitoring system configured to monitor and control a cooking process performed on a cooking surface of the cook top assembly, according to various embodiments.

Example embodiments are disclosed herein. It is understood, however, that the disclosed embodiments are merely exemplary and may be embodied in various and alternative forms. The figures are not necessarily to scale; some figures may be configured to show the details of a particular component. Therefore, specific structural and functional details disclosed herein are not to be interpreted as limiting but merely as a representative basis for the claims and/or teaching one skilled in the art to practice the embodiments.

In example embodiments, a cook top assembly includes a heated cooking surface for cooking food items. In certain embodiments, the cooking surface includes a plurality of cooking areas arranged, for example, in a grid. The cook top assembly includes a monitoring system including one or more temperature sensors configured to sense a temperature, e.g., a set cooking temperature or a first temperature change, at the cooking surface within one or more cooking areas of the cooking surface. In example embodiments, the monitoring system includes one or more temperature sensors disposed at a distance from the cooking surface, e.g., located on a range hood suspended over the cooking surface, and/or one or more temperature sensors disposed at or near the cooking surface, e.g., located on the cooking surface or at least partially embedded within the cooking surface. A controller is operatively coupled, e.g., communicatively coupled, to the one or more temperature sensors and a timing module. The controller is configured to receive from the temperature sensors one or more signals indicating a first temperature change at the cooking surface, for example, within one or more cooking areas indicating that a food item has been placed within the associated cooking area. For each cooking area wherein a first temperature change was sensed by the associated temperature sensor, the controller activates the timing module for a first predetermined time period based at least in part on the sensed first temperature change. In a particular embodiment, an associated temperature sensor monitors a temperature of the cooking surface within one or more cooking areas and provides an indication to the user that at least one of the monitored cooking areas is heated to a suitable temperature, e.g., a set cooking temperature, and available for a food product to be placed within the cooking area to begin the cooking process. In one embodiment, for example, when the cooking area reaches the set cooking temperature, the monitoring system transmits a “Go” or “Ready” signal indicating that the respective cooking area is available for cooking a food product.

After the controller determines that the first predetermined time period has elapsed, the controller, or a notification module and an indicator module operatively coupled to the controller, generates and outputs a signal, such as a visual signal, e.g., a blue light, and/or an audible signal, e.g., a hom or a tone, to instruct an operator of the cook top assembly to perform a first action, such as flipping the food item placed within the associated cooking area.

In example embodiments, after the first action has been completed by the operator, the controller receives from the associated temperature sensor a signal indicating a second temperature change at the cooking surface indicating, for example, that the food item has been flipped or turned to a second side. The controller then activates the timing module for a second predetermined time period. When the second predetermined time period has elapsed, the controller, e.g., the notification module and the indicator module, generates and outputs a signal to instruct the operator to perform a second action, such as flipping the food item to the first side or a third side or removing the food item from the cooking surface. The controller is configured to confirm that the second action has been completed by the operator and reset the timing module.

Figure 2:
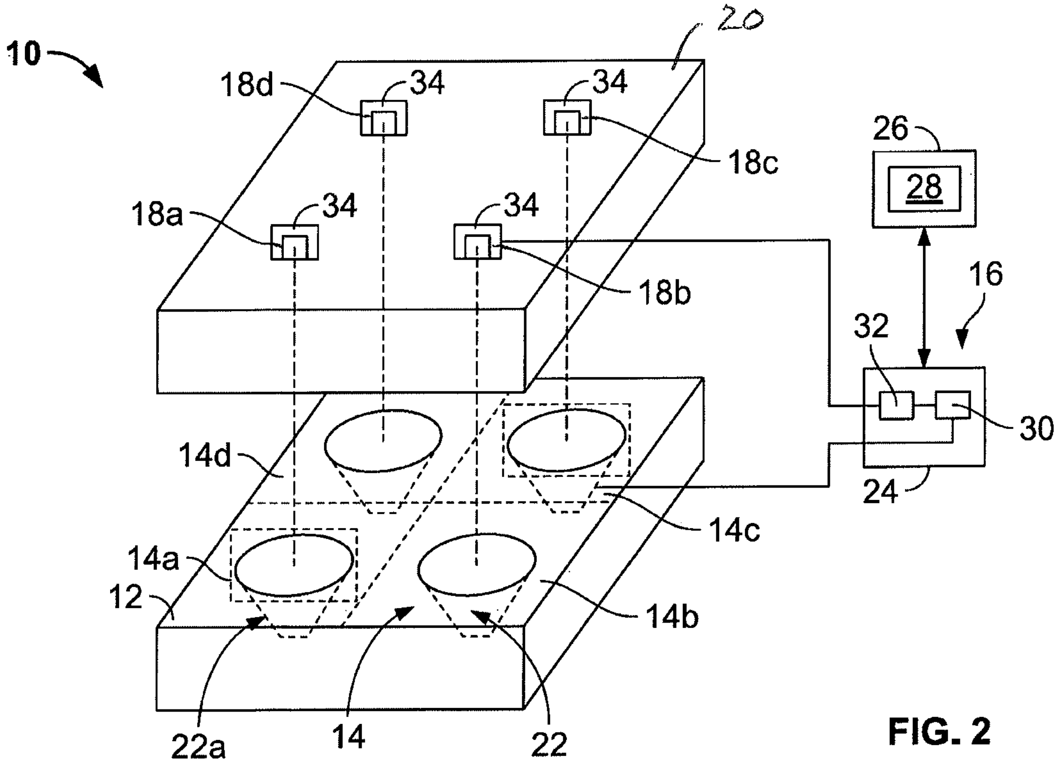
FIG. 2 is a perspective view of example cook top assembly including a monitoring system configured to monitor and control a cooking process performed on a cooking surface of the cook top assembly, according to various embodiments.

Referring now to the figures, FIGS. 1 and 2 are perspective views of example cook top assemblies including a monitoring system configured to monitor and control a cooking process performed on a cooking surface of the cook top assembly. As shown in FIG. 1, an example cook top assembly 10 includes a cooking surface 12. Cooking surface 12 can have any dimensions suitable for an intended application. For example, for commercial applications, cooking surface may have a length of 6-9 feet and a depth of 2-4 feet. In example embodiments, cooking surface 12 includes a plurality of cooking areas 14*a*, 14*b*, 14*c*, 14*d*, . . . 14*n*, as described in more detail below. In example embodiments, cooking surface 12 includes a plurality of rows of cooking areas 14 arranged in a plurality of columns forming a grid of cooking areas 14.

A monitoring system 16 is configured to monitor and control one or more cooking processes performed on cooking surface 12. In example embodiments, monitoring system 16 includes one or more temperature sensors 18 disposed at a distance from, e.g., located or positioned over, cooking surface 12. Monitoring system 16 may include only one temperature sensor 18, as shown in FIG. 1, configured to sense a temperature change at cooking surface 12. For example, sensor 18 is configured to sense a temperature change in one or more cooking areas 14*a*, 14*b*, 14*c*, 14*d*, . . . 14*n*. In particular embodiments, sensor 18 is configured to sense a temperature change in each cooking area 14*a*, 14*b*, 14*c*, 14*d*, . . . 14*n*. In alternative embodiments, as shown in FIG. 2, monitoring system 16 includes a plurality of temperature sensors 18, namely, temperature sensors 18*a*, 18*b*, 18*c*, 18*d*, . . . 18*n*, each associated with a respective cooking area 14*a*, 14*b*, 14*c*, 14*d*, . . . 14*n* and configured to sense a temperature change in the associated cooking area 14*a*, 14*b*, 14*c*, 14*d*, . . . 14*n*. In example embodiments, temperature sensor 18 is disposed in a range hood 20 positioned over cooking surface 12.

In alternative example embodiments, monitoring system 16 includes one or more temperature sensors 18 disposed at or near cooking surface 12. For example, monitoring system 16 includes one or more temperature sensors 18 operatively coupled to cooking surface 12, such as located on cooking surface 12 and/or at least partially embedded within cooking surface 12, and configured to sense a temperature, e.g., a set cooking temperature or a first temperature change, at cooking surface 12 within one or more cooking areas 14*a*, 14*b*, 14*c*, 14*d*, . . . 14*n*. In certain embodiments, monitoring system 16 includes one or more temperature sensors 18 disposed at a distance from the cooking surface, e.g., located on a range hood suspended over the cooking surface, and/or one or more temperature sensors 18 disposed at or near cooking surface 12, e.g., located on cooking surface 12 and/or at least partially embedded within cooking surface 12.

Any suitable type of sensor may be used to sense temperatures and/or temperature changes at cooking surface 12 including, without limitation, negative temperature coefficient (NTC) thermistors, such as a Fenwall ESX8206 glass encapsulated thermistors rated 470 KOhms at 25° C., positive temperature coefficient (PTC) thermistors, thermocouples, resistance temperature devices (RTDs), or solid state temperature sensors. Alternatively, temperature sensor 18 may be an infrared sensor, e.g., a thermal imaging sensor, which scans the entire cooking surface 12 or a portion thereof and provides temperature information to a controller or a processor, as described herein, for example. In certain embodiments, the infrared sensor provides temperature information at a large number of locations across cooking surface 12, e.g., within each cooking area 14. Accordingly, temperature information across the entire cooking surface 12 is collected and can be evaluated by the controller or the processor. In example embodiments, a variety of different configurations for cooking surface 12 including, for example, heating elements, such as described herein, of different quantities, sizes, shapes, and/or locations on cooking surface 12.

In example embodiments, one or more temperature sensors 18 sense a plurality of temperatures at cooking surface 12 over time. As a result, if temperature sensor 18 indicates a temperature change, e.g., a decrease or increase in temperature, the temperature change at cooking surface 12 is likely due to placement of one or more food items on cooking surface 12, e.g., placing an uncooked hamburger patty or an uncooked chicken breast on cooking surface 12. Additionally or alternatively, one or more temperature sensors 18 may sense a plurality of temperatures of one or more food items positioned on cooking surface 12 over time. Although monitoring system 16 of FIG. 1 suggests the use of a single temperature sensor 18, in alternative example embodiments, a plurality of temperature sensors 18 may be used. For example, as shown in FIG. 2, a plurality of temperature sensors 18 may be arranged to sense temperatures associated with a plurality of cooking areas 14*a*, 14*b*, 14*c*, 14*d*, . . . 14*n* on cooking surface 12 and/or one or more food items placed within one or more cooking areas 14*a*, 14*b*, 14*c*, 14*d*, . . . 14*n*. Further, temperature sensors 18 may be placed in multiple and/or alternative locations associated with cooking surface 12. With multiple temperature sensors 18, the temperature values sensed may, in certain embodiments, be averaged together for a more accurate reading.

Referring further to FIG. 1, cooking surface 12 includes a plurality of cooking areas 14*a*, 14*b*, 14*c*, 14*d*, . . . 14*n* and temperature sensor 18 is configured to sense a temperature change at cooking surface 12 in each cooking area 14 of the plurality of cooking areas 14*a*, 14*b*, 14*c*, 14*d*, . . . 14*n*. In alternative embodiments, as shown in FIG. 2, cooking surface 12 includes a plurality of cooking areas 14*a*, 14*b*, 14*c*, 14*d*, . . . 14*n* and first temperature sensor 18*a* of the plurality of associated temperature sensors 18*a*, 18*b*, 18*c*, 18*d*, . . . 18*n* is configured to sense the first temperature change in first cooking area 14*a* of the plurality of cooking areas 14*a*, 14*b*, 14*c*, 14*d*, . . . 14*n*.

As shown in FIGS. 1 and 2, cook top assembly 10 includes one or more heating sources 22 disposed at or under cooking surface 12 and configured to heat at least a portion of cooking surface 12 to a determined temperature. For example, in certain embodiments, heating source 22 is configured to heat cooking surface 12 within one or more cooking areas 14*a*, 14*b*, 14*c*, 14*d*, . . . 14*n* to a determined temperature. In example embodiments in which cooking surface 12 includes a plurality of cooking areas 14*a*, 14*b*, 14*c*, 14*d*, . . . 14*n*, cook top assembly 10 includes a plurality of heating sources 22, such as gas burners or electric heating elements, with a first heating source 22*a* that is associated with first cooking area 14*a*.

Referring to FIGS. 1 and 2, in example embodiments, a controller 24 is operatively coupled to a user interface 26. For example, user interface 26 may be operatively coupled to controller 24 by a hard-wired connection or user interface 26 may be integral to monitoring system 16, e.g., integral to controller 24. In various embodiments, user interface 26 includes a display 28 having one or more suitable inputs to monitor and control cooking processes performed on cooking surface 12. For example, user interface 26 may include one or more selection keys, e.g., "hamburger patty," "chicken breast," "fish fillet," "hamburger bun," and "pancakes" selection keys, to allow the operator to select or input a type of food item to be cooked in a respective cooking area 14 of cooking surface 12. If, for example, the user desires to cook a hamburger patty in cooking area 14*a*, then the associated selection key may be pressed a number of times to scroll through the menu of known foods, until "hamburger patty" appears on display 28. Additionally, user interface 26 may include one or more additional selection keys, e.g., "light," "medium," and "dark" selection keys, to allow the operator to select or input a desired level of doneness of the selected food item.

Further, in certain embodiments, user interface 26 may include visual indicators that indicate that one or more heating sources, as described below, is pre-heated or that the food item presently being cooked in a respective cooking area 14 is ready to be flipped, or is done cooking. User interface 26 may also include a speaker for sounding a tone when, for example, the heating source is pre-heated, the food is ready to be flipped, and/or the food is done cooking, as described herein.

In alternative example embodiments, user interface 26 may include a series of menus on display 28. In these alternative embodiments, rather than selecting or inputting cooking information with various selection keys, display 28 may include one or more pull-down menus comprising various lists of options (e.g., type of food, desired level of doneness, temperature), which may be selected by the operator using a suitable input device, such as a touch-screen, a stylus-pen operated screen, a mouse device, or a set of multipurpose keys associated with the screen, for example.

In further alternative embodiments, as the food item is initially placed on cooking surface 12, monitoring system 16 is configured to determine a category of foods to which the current food item being cooked belongs from certain characteristics of the food item, such as a mass, minimum temperatures, and/or magnitude and slope or a rate of an initial decrease in temperature associated with the current food item. In certain embodiments, if controller 24 determines that a food item has been placed on cooking surface 12, for example, within cooking area 14*a*, the operator may be prompted via user interface 26 to enter the type of food item being cooked within cooking area 14*a*. Based on the inputted information, controller 24 determines an appropriate recipe for cooking the food item and sets a timing module 30, as described herein, to cook the food item according to cooking information provided.

In certain embodiments, monitoring system 16 can be programmed such that one or more specific cooking areas 14 are reserved for specific food item types. In these embodiments, the operator has an opportunity to manually override a default reservation, if necessary, through user interface 26.

Controller 24 is operatively coupled to each temperature sensor 18. Controller 24 is configured to receive from temperature sensor 18 a signal indicating a first temperature change at cooking surface 12. For example, as shown in FIG. 2, in certain embodiments, a first temperature sensor 18*a* senses a first temperature change in a first cooking area 14*a* associated with first temperature sensor 18*a*. First temperature sensor 18*a* is configured to generate and transmit to controller 24 a signal indicative of the first temperature change at cooking surface 12 within first cooking area 14*a*. Controller 24, based at least in part on the first temperature change sensed by first temperature sensor 18*a*, is configured to activate a timing module 30 operatively coupled to controller 24, e.g., a timing module included in controller 24, as shown in FIGS. 1 and 2, or, alternatively, an independent timing module coupled in communication with controller 24. In example embodiments, controller 24 activates timing module 30 for a first predetermined time period based at least in part on the first temperature change sensed by first temperature sensor 18*a*.

In certain example embodiments, the first predetermined time period is a time period either during which timed cooking or heating is occurring, or during which a predetermined temperature is being achieved (e.g., pre-heating). Timed cooking may be based on a predetermined period of time, or may vary depending on a minimum temperature change value or a maximum temperature change value set by controller 24. For example, a larger food item having greater mass tends to have a steeper negative temperature slope than a smaller food item (i.e., the temperature decreases more quickly when the food item is placed on cooking surface 12). Thus, the predetermined time period in those situations may vary so that if a larger food item is detected, the predetermined time period may be automatically increased by controller 24 in order to compensate for differences in the mass of the food items, for example. The first predetermined time period may include an entire cycle of sensing the placement of a food item on cooking surface 12, timed cooking on a first side of the food item, and notifying the operator that the food item is ready to be flipped.

Monitoring system 16 also includes a notification module 32 operatively coupled to controller 24. In example embodiments, notification module 32 is included in controller 24, as shown in FIGS. 1 and 2. Alternatively, notification module 32 is an independent notification module coupled in communication with controller 24. Notification module 32 is operatively coupled, e.g., communicatively coupled, to an indicator module 34. In the example embodiments shown in FIGS. 1 and 2, indicator module 34 is located in the range hood adjacent temperature sensor 18 and includes a light source and/or a speaker. Notification module 32 is configured to generate and transmit a signal to indicator module 34 to output a signal, such as a visual signal, e.g., one or more light signals, and/or an audible signal, that the first predetermined time period has elapsed. The visual signal may be displayed on cooking surface 12, e.g., within a corresponding cooking area 14, and/or another suitable location, such as on a display screen or user interface of cook top assembly 10. The output signal instructs, urges, or requests an operator of cook top assembly 10 to perform a first action, e.g., flip a hamburger patty disposed upon the cooking area from a first side to an opposite second side. As mentioned above, in certain embodiments, controller 24 is configured to perform the functions of at least one of notification module 32 and indicator module 34. Alternatively, notification module 32 and/or indicator module 34 are integrated with and a part of controller 24.

In example embodiments, the one or more signals indicate that heating source 22 is pre-heated or that a food item presently being cooked is ready to be flipped, or is done cooking, for example. In particular embodiments, cook top assembly 10 includes separate indicator lights for each of these states, each of which is associated with appropriate textual legends (e.g., "pre-heated," "ready to flip," or "done cooking"). The status of cooking surface 12 and any food items placed on cooking surface 12 may be displayed on a single display. Additionally or alternatively, indicator module 34 and/or another component of cook top assembly 10, e.g., a user interface, may include a speaker for sounding a tone when, for example, the heating source is pre-heated, the food is ready to be flipped, and/or the food is done cooking.

In example embodiments, indicator module 34 is configured to illuminate a portion of cooking surface 12, e.g., an associated cooking area 14, with a color of light, e.g., a blue light indicating that the food item should be flipped or a red light indicating that the food item is cooked and should be removed from cooking surface 12, to provide the operator with a visual indication that an action should be taken. Further, the light may periodically flash, pulsate or blink, for example, if controller 24 determines that the associated action, flipping the food item or removing the food item from cooking surface 12, has not been completed after a suitable elapsed time period, or multiple or different lights (e.g., a red light on one half of cooking area 14 and a blue light on the other half of cooking area 14), or a symbol may be shone onto cooking surface 12 within cooking area 14. Indicator module 34 may include a bright light source, such as one or more halogen or one or more light-emitting diode (LED) light sources, to project the visual signals onto cooking surface 12. The visual signals may also include a text field or another visual indicator, such as a symbol or a schematic representation of an elapsed time of the cycle and the time remaining until the next action, i.e., the visual indication may be a countdown clock to provide a display of the time until the time for the next action is reached, or a visual indicator such as a moving arrow that visually depicts the relative position of the elapsed time over the entire time allocated for the specific task. The visual signals may also be projected onto other surfaces of cook top assembly 10, such as onto the range hood or onto a user interface or display screen. Other suitable signals and/or warnings may be used to indicate a required action.

In example embodiments, controller 24 is configured to confirm that the first action has been completed by the operator and, once the first action is completed, temperature sensor 18 is configured to sense a second temperature change cooking surface 12 in one or more cooking areas 14. For example, in certain embodiments, first temperature sensor 18*a*, described above, senses a second temperature change in first cooking area 14*a* associated with first temperature sensor 18*a* resulting from the food item being flipped onto a second side of the food item. First temperature sensor 18*a* is configured to generate and transmit to controller 24 a second signal indicative of the second temperature change at cooking surface 12 within first cooking area 14*a*. Controller 24 is configured to receive from first temperature sensor 18*a* a signal indicating the second temperature change. Based at least in part on the second temperature change sensed by first temperature sensor 18*a*, controller 24 activates timing module 30 for a second predetermined time period, the same or different than first predetermined time period. In certain embodiments, controller 24 is configured to activate notification module 32 and indicator module 34 to generate and output a second signal, e.g., a second visual signal and/or a second audible signal, that the second predetermined time period has elapsed and instructing the operator of cook top assembly 10 to perform a second action the same as or different from the first action. For example, indicator module 34 may output a signal to instruct, urge, or request the operator of cook top assembly 10 to flip the hamburger patty from the second side to the first side or remove the hamburger patty from cooking surface 12.

In certain example embodiments, the second predetermined time period is a time period that may include an entire cycle of sensing the placement of a food item on cooking surface 12 after the food item has been flipped, timed cooking on a second side of the food item, and notifying the operator that the food item is ready to be flipped to the first side or a third side, or that the food item is done being cooked. In certain embodiments, controller 24 is further configured to confirm that the second action has been completed by the operator. Upon confirmation that the second action has been completed, controller 24 is configured to reset timing module 30 and/or terminate the associated cooking process.

In some embodiments, controller 24 may also generate a signal to notification module 32, which provides a signal to indicator module 34 (or an alternate indicator module to provide a more remote visual indication) that a new cooking step should be performed that relates to the primary cooking task being monitored. For example, in embodiments where monitoring system 16 is adapted for cooking a hamburger patty, monitoring system 16 may generate a visual indication to the operator that a hamburger bun should be placed on cooking surface 12 within a second cooking area, such as cooking area 14*b* for a period of time to toast the hamburger bun just before controller 24 determines that the hamburger patty positioned within cooking area 14*a*, for example, is fully cooked and can be removed from cooking surface 12.

In example embodiments, controller 24 is operatively coupled to each heating source 22 to control a thermal output of heating source 22 based at least in part on the temperature change sensed by associated temperature sensor 18 such that heating source 22 heats at least a portion of cooking surface 12 to a determined temperature, e.g., a desired temperature, controlled by controller 24 or the operator. In certain embodiments in which cooking surface 12 includes a plurality of cooking areas 14*a*, 14*b*, 14*c*, 14*d*, . . . 14*n*, first heating source 22*a* is associated with first cooking area 14*a*. Heating source 22*a* is configured to heat cooking surface 12 within first cooking area 14*a* to the determined temperature. Controller 24 is operatively coupled to heating source 22*a* to control a thermal output of heating source 22*a* based at least in part on a temperature change at cooking surface 12 within first cooking area 14*a*, e.g., the first temperature change or the second temperature change sensed by temperature sensor 18*a*.

Figure 3:
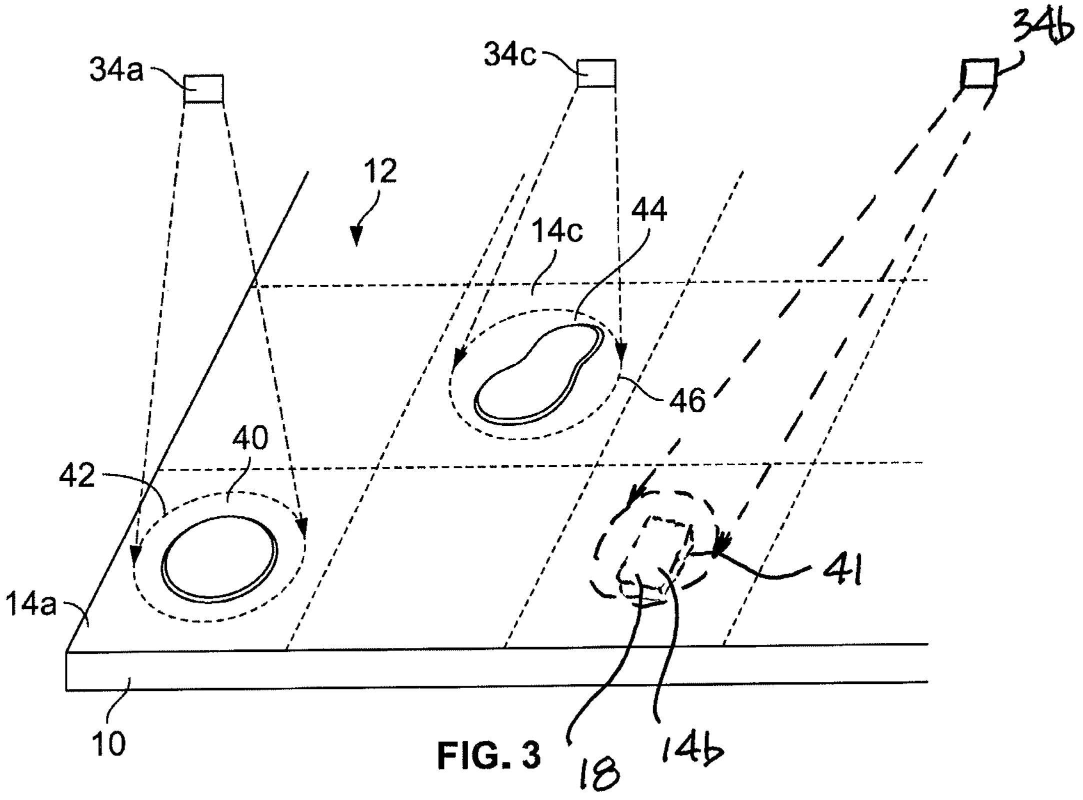
FIG. 3 is a perspective view of an example cook top assembly with food items positioned within respective cooking areas of a cooking surface during a cooking process, according to various embodiments.
Figure 4:
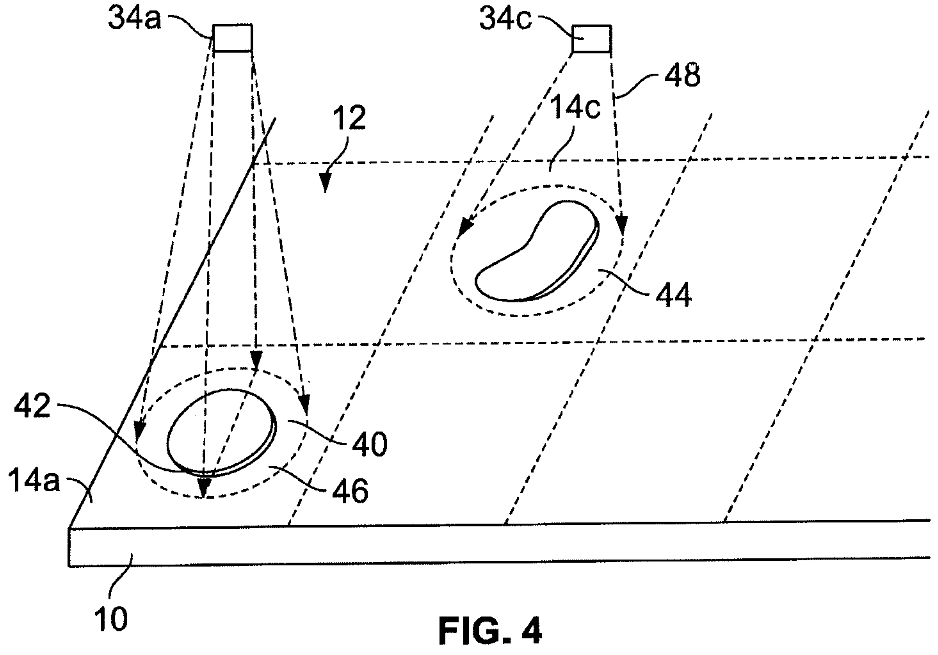
FIG. 4 is a perspective view of an example cook top assembly with food items positioned within respective cooking areas of a cooking surface during a cooking process, according to various embodiments.

Referring now to FIGS. 3 and 4, in example embodiments, during the cooking process of food items controller 24, e.g., notification module 32 and/or indicator module 34, generates and outputs various signals, e.g., instructional signals including one or more visual signals, such as one or more color light signals and/or one or more text fields including textual information, and/or one or more audible signals, indicating that a cooking time period has elapsed or that an action or task should be performed, for example.

As shown in FIG. 3, in example embodiments, one or more indicator modules 34 illuminate a portion of cooking surface 12 to provide the operator with an instructional visual indication that an action should be taken. In a particular embodiment, indicator module 34*b* may illuminate one or more cooking areas, e.g., cooking area 14*b*, with a color of light, e.g., a green light 41, indicating that an associated temperature sensor senses that a temperature of cooking surface 12 within cooking area 14*b* is at a suitable temperature, e.g., a set cooking temperature, and cooking area 14*b* is available for a food product to be placed within cooking area 14*b* to begin the cooking process. Additionally or alternatively, for example, when cooking area 14*b* reaches the set cooking temperature, monitoring system 16 transmits a "Go" or "Ready" signal indicating that cooking area 14*b* is available for cooking a food product.

Further, in an example embodiment, when the first predetermined time period elapses, indicator module 34*a* illuminates a first portion 40 of associated cooking area 14*a* with a color of light, e.g., a blue light 42, indicating that the food item (hamburger patty) should be flipped. Similarly, when the second predetermined time period elapses, indicator module 34*a* illuminates first portion 40 of associated cooking area 14*a* with a different color of light, e.g., a red light, indicating that the hamburger patty should be removed from cooking area 14*a*. As shown in FIG. 3, when second predetermined time period associated with a cooking process of the food item (chicken breast) being cooked in cooking area 14*c* elapses, indicator module 34*c* illuminates a first portion 44 of associated cooking area 14*c*, with a color of light, e.g., a red light 46, indicating that the chicken breast is cooked and should be removed from cooking area 14*c*.

Further, if controller 24 determines that the associated action (e.g., flipping the food item or removing the food item from cooking surface 12) has not been completed after a suitable elapsed time period, the light may periodically flash, pulsate or blink, for example, to warn the operator that the respective first action or the respective second action must be completed. Alternatively, indicator module 34 may output multiple or different light signals to illuminate first portion 40 (e.g., a blue light 42 on one half of first portion 40 of cooking area 14*a* and a red light 46 on the other half of first portion 40 of cooking area 14*a*, as shown in FIG. 4), or a symbol may be shone onto cooking surface 12 within cooking area 14*a*. Further, in certain embodiments, indicator module 34, such as indicator module 34*c* in FIG. 4, may output a visual signal 48, e.g., a light signal, to illuminate first portion 44 indicating that a predetermined time period, e.g., the second predetermined time period, has elapsed. Similarly, indicator module 34*c* may output a visual signal different from or the same as visual signal 48 to illuminate first portion 44 indicating that the first predetermined time period has elapsed.

Figure 5:
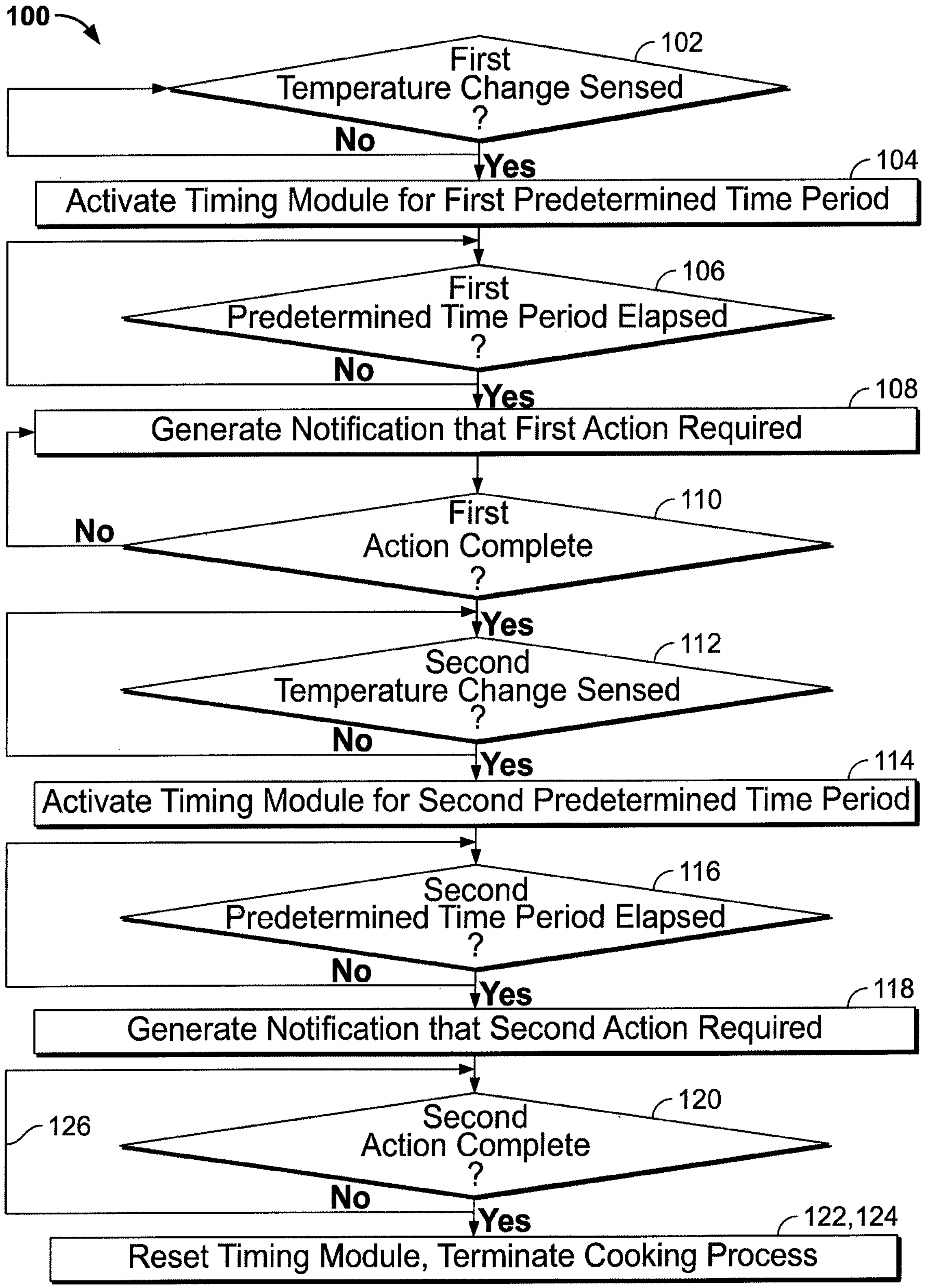
FIG. 5 is a flow diagram of an example method for monitoring and controlling a cooking process of an example cook top assembly, according to various embodiments.

FIG. 5 is a flow diagram of an example method 100 for monitoring and controlling a cooking process on cooking surface 12 of cook top assembly 10. In example embodiments of this method, cooking surface 12 includes a plurality of cooking areas 14*a*, 14*b*, 14*c*, 14*d*, . . . 14*n*. Initially, in example embodiments, monitoring system 16, based on a temperature sensor 18 associated with cooking area 14*a*, indicates that a temperature of cooking surface 12 within cooking area 14*a* is at a suitable temperature, e.g., a set cooking temperature, and cooking area 14*a* is available for a food product to be placed within cooking area 14*a* to begin the cooking process. In a particular embodiment, indicator module 34*b* may illuminate one or more cooking areas, e.g., cooking area 14*a*, with a color of light, e.g., a green light, indicating that an associated temperature sensor senses that a temperature of cooking surface 12 within cooking area 14*a* is at a suitable temperature, e.g., a set cooking temperature, and cooking area 14*a* is available for a food product to be placed within cooking area 14*a* to begin the cooking process. Additionally or alternatively, for example, when cooking area 14*a* reaches the set cooking temperature, monitoring system 16 transmits a "Go" or "Ready" signal indicating that cooking area 14*a* is available for cooking a food product.

At step 102, first temperature sensor 18*a* disposed at a distance from, e.g., over, first cooking area 14*a* of cooking surface 12 or at or near first cooking area 14*a* (operatively coupled to, disposed or embedded in cooking surface 12, e.g., embedded in first cooking area 14*a* of cooking surface 12), senses a first temperature change at cooking surface 12 within first cooking area 14*a* of the plurality of cooking areas 14. Timing module 30 is activated 104 by controller 24 for a first predetermined time period based at least in part on the first temperature change sensed by first temperature sensor 18*a*. At step 106, controller 24 generates a first signal that the first predetermined time period has elapsed and instruct, urge, or request 108 the operator to perform a first action. In a particular embodiment, notification module 32 operatively coupled to controller 24 is configured to generate and transmit a signal to indicator module 34 which outputs a signal, such as a visual signal, e.g., one or more light signals, and/or an audible signal, that the first predetermined time period has elapsed. The visual signal may be displayed on cooking surface 12, e.g., within a corresponding cooking area 14, and/or another suitable location, such as on a display screen or user interface of cook top assembly 10. The output signal instructs, urges, or requests an operator of cook top assembly 10 to perform a first action, e.g., flip a burger from a first side to an opposite second side.

In certain embodiments, controller 24 confirms 110 that the first action has been completed by the operator. Once the first action is completed, first temperature sensor 18*a* senses 110 a second temperature change at cooking surface 12 within first cooking area 14*a*. At step 112, controller 24 receives a signal from first temperature sensor 18*a* indicating a second temperature change. Controller 24 activates 114 timing module 30 for a second predetermined time period. Once the second predetermined time period has elapsed 116, a second signal is generated 118 by controller 24 to instruct, urge, or request the operator to perform a second action. For example, controller 24 is configured to activate notification module 32 and indicator module 34 to generate and output a second signal, e.g., a second visual signal and/or a second audible signal, instructing the operator of cook top assembly 10 to perform a second action the same as or different from the first action. For example, indicator module 34 may output a signal to instruct, urge, or request the operator of cook top assembly 10 to flip the burger from the second side to the first side or remove the burger from cooking surface 12. In certain embodiments, completion of the second action by the operator is confirmed 120. Once completion of the second action is confirmed, controller 24 resets 122 timing module 30 and, in certain embodiments, terminates 124 the cooking process. Further, controller 24 may generate 126 a warning signal indicating that the cooking process is completed and instructing the operator to perform the second action.

In a very basic configuration, controller 24 includes, or accesses, components such as at least one control logic circuit, central processing unit, or processor, and one or more computer-readable media. Each processor may itself comprise one or more processors or processing cores. For example, each processor can be implemented as one or more microprocessors, microcomputers, microcontrollers, digital signal processors, central processing units, state machines, logic circuitries, and/or any devices that manipulate signals based on operational instructions. In some cases, the processor may be one or more hardware processors and/or logic circuits of any suitable type specifically programmed or configured to execute the algorithms and processes described herein. The processor can be configured to fetch and execute computer-readable instructions stored in a computer-readable media or other computer-readable media.

Depending on the configuration of controller 24, computer-readable media may be an example of tangible non-transitory computer storage media and may include volatile and nonvolatile memory and/or removable and non-removable media implemented in any type of technology for storage of information such as computer-readable instructions, data structures, program modules or other data. The computer-readable media may include, but is not limited to, RAM, ROM, EEPROM, flash memory or other computer readable media technology, CD-ROM, digital versatile disks (DVD) or other optical storage, magnetic cassettes, magnetic tape, solid-state storage and/or magnetic disk storage. Further, in some cases, controller 24 may access external storage, such as RAID storage systems, storage arrays, network attached storage, storage area networks, cloud storage, or any other medium that can be used to store information and that can be accessed by the processor directly or through another computing device or network. Accordingly, computer-readable media may be computer storage media able to store instructions, modules or components that may be executed by the processor.

Computer-readable media may be used to store and maintain any number of functional components that are executable by the processor. In some implementations, these functional components comprise instructions or programs that are executable by the processor and that, when executed, implement operational logic for performing the actions attributed above to controller 24. Functional components of controller 24 stored in the computer-readable media may include the operating system and a user interface module for controlling and managing various functions of various components of cook top assembly 10, for example, temperature sensor(s) 18, heating source(s) 22, timing module 30, notification module 32, and/or indicator module 34.

Controller 24 may further include one or more communication interfaces, which may support both wired and wireless connection to various networks, such as cellular networks, radio, Wi-Fi networks, close-range wireless connections, near-field connections, infrared signals, local area networks, wide area networks, the Internet, and so forth. The communication interfaces may further allow a user to access storage on or through another device, such as a remote computing device, a network attached storage device, cloud storage, or the like.

Controller 24 may further be equipped with one or more various input/output (I/O) components. Such I/O components may include a touchscreen and various user controls (e.g., buttons, a joystick, a keyboard, a keypad, etc.), a haptic or tactile output device, connection ports, physical condition sensors, and so forth. For example, the operating system of controller 24 may include suitable drivers configured to accept input from a keypad, keyboard, or other user controls and devices included as I/O components. Additionally, controller 24 may include various other components that are not shown, examples of which include removable storage, a power source, such as a battery and power control unit, a PC Card component, and so forth.

Embodiments of the disclosure can be described in view of the following clauses:

1. A cook top assembly, comprising:
   a cooking surface;
   a monitoring system configured to monitor and control a cooking process on the cooking surface, the monitoring system comprising:
   a temperature sensor configured to sense a first temperature change at the cooking surface; and
   a controller operatively coupled to the temperature sensor, the controller configured to:
   receive from the temperature sensor a first signal indicating the first temperature change; and
   activate a timing module operatively coupled to the controller for a first predetermined time period based at least in part on the first temperature change sensed by the temperature sensor.

2. The cook top assembly of clause 1, further comprising:
   a notification module operatively coupled to the controller, the notification module configured to generate a second signal that the first predetermined time period has elapsed; and
   an indicator module operatively coupled to the notification module, the indicator module configured to receive the second signal from the notification module and output a first instructional signal for instructing an operator of the cook top assembly to perform a first action.

3. The cook top assembly of clauses 1 or 2, wherein the controller is configured to confirm that the first action has been completed by the operator.

4. The cook top assembly of any of clauses 1-3, wherein the controller is configured to:
   confirm that the second action has been completed by the operator; and
   reset the timing module.

5. The cook top assembly of any of clauses 1-4, wherein, once the first action is completed, the temperature sensor is configured to sense a second temperature change; and the controller is configured to:
   receive from the temperature sensor a third signal indicating the second temperature change;
   activate the timing module for a second predetermined time period; and
   activate the notification module and the indicator module to generate and output a second instructional signal for instructing the operator to perform a second action.

6. The cook top assembly of any of clauses 1-5, wherein the first instructional signal comprises a first color light indicating the first action should be performed and the second instructional signal comprises a second color light different from the first color light indicating the second action should be performed.

7. The cook top assembly of clause 6, wherein at least one of the first instructional signal and the second instructional signal further comprises an audible warning tone that the respective first action or the respective second action has not been completed after an elapsed time.

8. The cook top assembly of clause 6, wherein at least one of the first color light and the second color light flashes periodically to warn the operator that the respective first action or the respective second action has not been completed after an elapsed time.

9. The cook top assembly of any of clauses 1-8, wherein at least one of the first instructional signal and the second instructional signal comprises a text field including textual information displayed on at least one of the cooking surface, a range hood positioned over the cooking surface, and a user interface.

10. The cook top assembly of any of clauses 1-9, wherein at least one of the first instructional signal and the second instructional signal includes at least one of the following: a visual signal and an audio signal.

11. The cook top assembly of any of clauses 1-10, wherein the cooking surface includes a plurality of cooking areas and the temperature sensor is configured to sense a temperature change at the cooking surface in each cooking area of the plurality of cooking areas.

12. The cook top assembly of any of clauses 1-11, wherein the cooking surface includes a plurality of cooking areas and the temperature sensor is configured to sense the first temperature change in a first cooking area of the plurality of cooking areas.

13. The cook top assembly of any of clauses 1-12, further comprising a heating source disposed under the cooking surface, the heating source configured to heat the cooking surface to a determined temperature.

14. The cook top assembly of clause 13, wherein the cooking surface includes a plurality of cooking areas, and the heating source is associated with a first cooking area of the plurality of cooking area.

15. The cook top assembly of clause 14, wherein the controller is operatively coupled to the heating source, the controller configured to control a thermal output of the heating source based at least in part on the first temperature change sensed by the temperature sensor.

16. The cook top assembly of any of clauses 1-15, wherein the temperature sensor is disposed in one of a range hood positioned over the cooking surface and in the cooking surface.

17. The cook top assembly of any of clauses 1-16, wherein the cooking surface includes a plurality of cooking areas, the cook top assembly comprising a plurality of temperature sensors, each temperature sensor of the plurality of temperature sensors is associated with a respective cooking area of the plurality of cooking areas.

18. A monitoring system for a cook top assembly including a cooking surface having a plurality of cooking areas, the monitoring system comprising:

a temperature sensor configured to sense a first temperature change at the cooking surface within a first cooking area of the plurality of cooking areas; and a controller operatively coupled to the temperature sensor and including a timing module, the controller configured to:

receive from the temperature sensor a first signal indicating the first temperature change; and activate the timing module for a first predetermined time period based at least in part on the first temperature change sensed by the temperature sensor.

19. The monitoring system of clause 18, wherein the controller is further configured to:

determine that the first predetermined time period has elapsed; and output a second signal to instruct an operator of the cook top assembly to perform a first action.

20. The monitoring system of clauses 18 or 19, wherein the controller is further configured to:

confirm that the first action has been completed by the operator;

receive from the temperature sensor a third signal indicating a second temperature change at the cooking surface;

activate the timing module for a second predetermined time period;

determine that the second predetermined time period has elapsed; and output a fourth signal to instruct the operator to perform a second action.

21. The monitoring system of any of clauses 18-20, wherein the second signal comprises a first color light illuminating a first portion of the first cooking area indicating the first action should be performed and the fourth signal comprises a second color light different from the first color light illuminating the first portion of the first cooking area indicating the second action should be performed.

22. The monitoring system of any of clauses 18-21, wherein at least one of the second signal and the fourth signal further comprises an audible warning tone that the respective first action or the respective second action has not been completed after an elapsed time.

23. The monitoring system of any of clauses 18-22, wherein at least one of the first color light and the second color light flashes periodically to warn the operator that the respective first action or the respective second action has not been completed after an elapsed time.

24. The monitoring system of any of clauses 18-23, wherein the second signal comprises a text field including textual information displayed on a first portion of the first cooking area indicating the first action should be performed and the fourth signal comprises a text field including textual information displayed on the first portion of the first cooking area indicating the second action should be performed.

25. The monitoring system of any of clauses 18-24, wherein the second signal comprises a first color light illuminating a first half of the first portion of the first cooking area and a second color light different from the first color light illuminating a second half of the first portion of the first cooking area indicating the first action should be performed.

26. The monitoring system of any of clauses 18-25, wherein the controller is configured to:

confirm that the second action has been completed by the operator; and reset the timing module.

27. A method for monitoring and controlling a cooking process on a cooking surface of a cook top assembly, the cooking surface including a plurality of cooking areas, the method comprising:

sensing, with a temperature sensor, a first temperature change at the cooking surface within a first cooking area of the plurality of cooking areas; and activating, by a controller, a timing module for a first predetermined time period based at least in part on the first temperature change sensed by the temperature sensor.

28. The method of clause 27, further comprising generating, by the controller, a first signal that the first predetermined time period has elapsed and instructing an operator of the cook top assembly to perform a first action.

29. The method of clauses 27 or 28, further comprising confirming by the controller that the first action has been completed by the operator.

30. The method of any of clauses 27-29, further comprising, once the first action is completed:

sensing, by the temperature sensor, a second temperature change at the cooking surface within the first cooking area;

activating, by the controller, the timing module for a second predetermined time period; and generating, by the controller, a second signal that the second predetermined time period has elapsed and instructing the operator to perform a second action.

31. The method of any of clauses 27-30, further comprising:

confirming, by the controller, that the second action has been completed by the operator; and resetting the timing module.

32. The method of any of clauses 27-31, further comprising generating, by the controller, a warning signal indicating that the cooking process is completed.

Various instructions, methods and techniques described herein may be considered in the general context of computer-executable instructions, such as program modules stored on computer storage media and executed by the processors herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

One skilled in the art will realize that a virtually unlimited number of variations to the above descriptions are possible, and that the examples and the accompanying figures are merely to illustrate one or more examples of implementations.

It will be understood by those skilled in the art that various other modifications can be made, and equivalents can be substituted, without departing from claimed subject matter. Additionally, many modifications can be made to adapt a particular situation to the teachings of claimed subject matter without departing from the central concept described herein. Therefore, it is intended that claimed subject matter not be limited to the particular embodiments disclosed, but that such claimed subject matter can also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter can be practiced without these specific details. In other instances, methods, devices, or systems that would be known by one of ordinary skill have not been described in detail so as not to obscure claimed subject matter.

Reference throughout this specification to "one embodiment" or "an embodiment" can mean that a particular feature, structure, or characteristic described in connection with a particular embodiment can be included in at least one embodiment of claimed subject matter. Thus, appearances of the phrase "in one embodiment" or "an embodiment" in various places throughout this specification are not necessarily intended to refer to the same embodiment or to any one particular embodiment described. Furthermore, it is to be understood that particular features, structures, or characteristics described can be combined in various ways in one or more embodiments. In general, of course, these and other issues can vary with the particular context of usage. Therefore, the particular context of the description or the usage of these terms can provide helpful guidance regarding inferences to be drawn for that context.

The invention claimed is:

1. A cook top assembly, comprising:

a cooking surface;

a monitoring system configured to monitor and control a cooking process on the cooking surface, the monitoring system comprising:

a temperature sensor configured to sense a first temperature change at the cooking surface; and a controller operatively coupled to the temperature sensor, the controller configured to:

receive from the temperature sensor a first signal indicating the first temperature change; and activate a timing module operatively coupled to the controller for a first predetermined time period based at least in part on the first temperature change sensed by the temperature sensor;

a notification module operatively coupled to the controller, the notification module configured to generate a second signal that the first predetermined time period has elapsed; and an indicator module operatively coupled to the notification module, the indicator module configured to receive the second signal from the notification module and output a first instructional signal for instructing an operator of the cook top assembly to perform a first action associated with cooking a food item present on the cooking surface, wherein the first instructional signal is light that is directed towards and illuminates the cooking surface with a textual message that explicitly directs the operator to perform the first action associated with cooking the food item present on the cooking surface;

wherein the controller determines a category of foods to which a food item present on the cooking surface belongs based on a characteristic of the food item, wherein the characteristic is selected from the group consisting of mass, minimum temperatures, and magnitude and slope or rate of an initial decrease in temperature associated with the food item.

2. The cook top assembly of claim 1, wherein the characteristic is a magnitude and slope or rate of an initial decrease in temperature associated with the food item.

* * * * *